E. G. BAILEY.
LIQUID METER.
APPLICATION FILED JAN. 22, 1913.
1,200,914.
Patented Oct. 10, 1916.
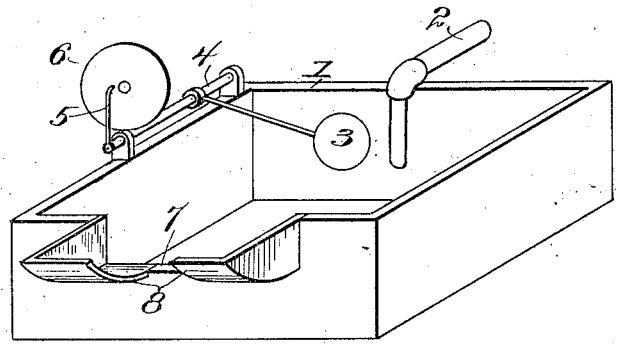
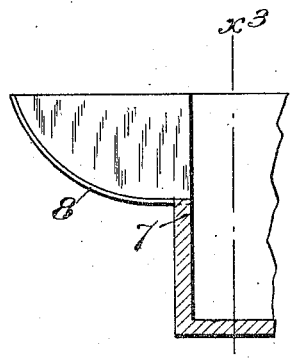
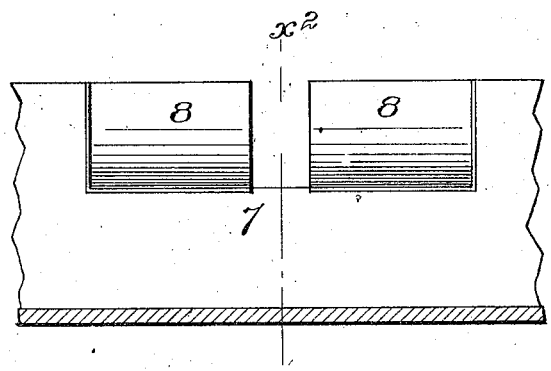
Witnesses:
Jas. J. Maloney
Inventor:
Ervin G. Bailey

UNITED STATES PATENT OFFICE.

ERVIN G. BAILEY, OF NEWTON HIGHLANDS, MASSACHUSETTS, ASSIGNOR, BY MESNE ASSIGNMENTS, TO THE KENNICOTT COMPANY, OF CHICAGO HEIGHTS, ILLINOIS, A CORPORATION OF ILLINOIS.

LIQUID-METER.

1,200,914. Specification of Letters Patent. Patented Oct. 10, 1916.

Application filed January 22, 1913. Serial No. 743,479.

*To all whom it may concern:*

Be it known that I, ERVIN G. BAILEY, a citizen of the United States, residing in Newton Highlands, in the county of Middlesex and State of Massachusetts, have invented an Improvement in Liquid-Meters, of which the following description, in connection with the accompanying drawings, is a specification, like letters on the drawings representing like parts.

The present invention relates to a liquid meter, and is embodied in a meter having a dam or obstruction provided with an aperture, the said aperture, in accordance with the invention, being so constructed that the rate of flow of liquid through it will vary in any desired relation to the head.

In using any of the usual forms of weirs, the head or vertical height of the surface of the liquid above the crest or sill of the weir can be easily recorded by the use of a float, the movement of which, as the level changes, causes a pen movement on a chart. The chart, however, in this case obviously records nothing but the head, and as the rate of flow is not directly proportional to the head, the rate of flow of liquid can only be found by calculation from the record shown at any given time. Furthermore, the average rate of flow for an interval of time cannot be determined by merely finding the average head during said interval of time. For example, in a weir having a rectangular opening, the rate of flow varies substantially as the three-halves power of the head and in a weir having a triangular opening, it varies substantially as the five halves power of the head. On account of this fact, correct results cannot be obtained by averaging the heads throughout a period of time and using the average head in the mathematical formula or calibration curve to ascertain the average rate of flow during such period of time, if the rate of flow varies. Under such conditions it is necessary to take a number of readings of the head and by means of a formula or curve determine the rate of flow for each head separately and average the rates of flow. In order, therefore, that the average of any quantity may be obtained from a chart showing a polar or rectangular record, by the use of any of the usual types of planimeters or radii averaging instruments, it is necessary that the recording pen should move in direct proportion to the quantity to be recorded and averaged; and this may be accomplished by so proportioning the effective area of the aperture to the height of the water above the crest that the rate of flow will be directly proportional to the head.

The present invention is embodied in novel means for varying the size of the aperture in proportion to the head, for the purposes set forth.

Figure 1 is a perspective view of a measuring reservoir provided with a weir embodying this invention; Fig. 2 is an enlarged vertical section across the aperture; and Fig. 3 is an enlarged vertical section looking toward the aperture.

In accordance with the invention, the effective area of the egress through the obstruction is varied in relation to the height of the surface of the liquid above the bottom of the opening, by forming the egress so that the complete boundary thereof has horizontal as well as vertical components; and, by duly proportioning these components one to the other, it is possible to modify the egress area, as it increases with the increase in the head, in such a way that the rate of flow of liquid through the egress will vary directly as the head. This is accomplished by locating the boundary of said egress partly outside of a vertical plane through that part of the lowest point of egress which is first reached by the flowing liquid. There are many ways by which this may be accomplished, and I have herein shown as an illustration a meter comprising a reservoir 1 adapted to receive a liquid through a pipe 2, and discharge the said liquid through the weir notch or aperture, it being obvious that the level of the liquid will depend upon the rate of flow through the meter. As a convenient means for obtaining a record, therefore, the reservoir may be provided with a float 3 connected with the rock shaft 4 which has a pen 5 adapted to make a record on a rotatable chart 6 of the usual type. In accordance with the invention, however, the egress or weir notch, instead of consisting of an opening which is wholly in a vertical plane through the part first reached by the flowing liquid, consists of an opening which is mainly beyond said plane, the boundaries of said opening having horizontal, as well as vertical, components.

In the rectangular reservoir shown, the front wall 7 constitutes the obstruction to the flow of liquid, and the part of the aperture first reached by the flowing liquid is that part of the front wall which is at the inner end of the opening. The said opening is formed in an extension which consists of the curved lips 8 projecting beyond said wall 7, starting from a horizontal plane, and curving upward toward a vertical plane. This opening, therefore, is bounded at the bottom by the part first reached by the liquid, and at the sides by the curved edges of the lips; and, except as a matter of convenience, it is immaterial what the shape of the entire obstruction may be, provided that the edges of the aperture are so shaped that the relation between the horizontal and vertical components is such as to bring about the desired relation between the rate of flow and the head.

The relation desired is obtained by taking into consideration the laws governing the flow of liquids and observing the coefficient of flow under various conditions, and from such data calculating the shape of the curved surfaces of the egress, or any equivalent therefor, which is necessary to bring about the desired result. For instance, if it is desired that the rate of flow of liquid through the egress of the meter shall be directly proportional to the head, it is evident that the equation (1) $\quad Q = kh \quad$ must be satisfied in which $Q$ = rate of flow of liquid, such as cubic feet per second;
$h$ = head of liquid over the lowest point of egress; and
$k$ = a constant expressing the amount of flow per unit head.

The well known basic law of hydraulics relative to the flow of liquids through any shaped aperture is mathematically expressed as follows:

(2) $\quad dQ = cda\sqrt{2gh}$ in which $dQ$ is the quantity discharged through said elementary area $da$;
$h$ = head producing flow through said elementary area $da$;
$c$ = coefficient of discharge;
$da$ = said elementary area;
$g$ = acceleration due to the force of gravity.

The next step is to find what shaped aperture will satisfy both of the above equations. In accordance with the present invention I have found that this can be successfully carried out by making the distance between the edges of the opening uniform and varying the inclination which these edges make with a horizontal, as shown in the drawings.

The area of discharge for any head would be mathematically expressed as $bp$ where $b$ is the distance between the curved lips and $p$ is the distance measured along the curved lips from the lowest point of egress to the level of the liquid on the up stream side of the aperture. From this is derived the following equation—

(3) $\quad a = bp$.

The differential of which equation is—

$$da = bdp.$$

The differential of equation (1) is—

$$dQ = kdh.$$

By combination and squaring, the following equation is obtained:

(4) $\quad k^2(dh)^2 = c^2b^2(dp)^2 2gh$.

In order to determine mathematically the shape to which the lips should be curved it is convenient to make the calculations on a basis of rectangular coördinates. Hence let $x$ be the distance from any point on the curved edge of the lips, measured along the horizontal to a vertical projection from the bottom of the curve. It is evident therefore, that the following equation is derived:

(5) $\quad (dp)^2 = (dx)^2 + (dh)^2$.

Hence by substitution is obtained equation (6) $\quad dx = \dfrac{\sqrt{k^2 - c^2b^2 2gh}}{cb\sqrt{2gh}} dh$ From which by integration is obtained equation (7) $\quad x = \sqrt{\left(\dfrac{k^2}{c^2b^2 2g} - h\right)h} + \dfrac{k^2}{c^2b^2 2g}\sin.^{-1}\sqrt{\dfrac{hc^2b^2 2g}{k^2}}$ The construction and calibration of a weir upon this basis has shown great accuracy and usefulness and has many advantages over any other known form of liquid meter. It is perfectly obvious that, when desired, any other relation between rate of flow and head could be secured in accordance with the present invention in a similar manner. It is further obvious that the width of the opening need not be constant but any desired relation between the width and the other factors might be assumed, and the final form, to meet all requirements, may still be ascertained.

What I claim is:

1. A liquid meter comprising a dam or obstruction in the path of the liquid to be measured, said dam having an aperture the lateral boundaries of which are so shaped as to satisfy the terms of the equation $$x = \sqrt{\left(\frac{k^2}{c^2b^22g} - h\right)h} + \frac{k^2}{c^2b^22g} \sin.^{-1}\sqrt{\frac{hc^2b^22g}{k^2}}$$

substantially as herein described.

2. In a liquid meter, a weir having a liquid discharge opening with substantially parallel lateral edges said weir being curved whereby the quantity of liquid discharged is substantially proportional to the head of liquid.

3. A weir having an orifice which extends horizontally from the crest of the weir as well as vertically therefrom, the plane of the orifice varying in inclination to the horizontal at different distances from the crest of the weir so as to secure a desired variation in the operative area of the orifice with respect to a given variation in the head.

In testimony whereof, I have signed my name to this specification in the presence of two subscribing witnesses.

ERVIN G. BAILEY.

Witnesses:
   JAS. J. MALONEY,
   W. E. COVENEY.